United States Patent
Gruner et al.

(10) Patent No.: US 11,526,456 B1
(45) Date of Patent: Dec. 13, 2022

(54) SYSTEM AND METHOD FOR FILTERING PROCESS I/O OPERATIONS IN KERNEL-MODE

(71) Applicant: CYNET SECURITY LTD, Rishon Lezion (IL)

(72) Inventors: Eyal Gruner, Rishon Lezion (IL); Aviad Hasnis, Rishon Lezion (IL); Mathieu Wolf, Rishon Lezion (IL); Igor Lahav, Rishon Lezion (IL); Avi Cashingad, Rishon Lezion (IL); Tomer Gavish, Rishon Lezion (IL)

(73) Assignee: CYNET SECURITY LTD, Rishon Lezion (IL)

( * ) Notice: Subject to any disclaimer, the term of this patent is extended or adjusted under 35 U.S.C. 154(b) by 0 days.

(21) Appl. No.: 17/465,286

(22) Filed: Sep. 2, 2021

(51) Int. Cl.
*G06F 13/20* (2006.01)

(52) U.S. Cl.
CPC .................. *G06F 13/20* (2013.01)

(58) Field of Classification Search
CPC ...................................... G06F 13/20
USPC ........................................ 710/112
See application file for complete search history.

(56) References Cited

U.S. PATENT DOCUMENTS

| | | | | |
|---|---|---|---|---|
| 5,577,224 A * | 11/1996 | DeWitt | ............... | G06F 12/0866 711/118 |
| 6,073,199 A * | 6/2000 | Cohen | ................... | G06F 13/364 710/107 |
| 6,330,632 B1 * | 12/2001 | Watts | .................... | G06F 13/161 710/240 |
| 7,448,049 B1 * | 11/2008 | Xing | ......................... | G06F 9/54 709/200 |
| 7,774,313 B1 * | 8/2010 | Nachenberg | ........ | G06F 11/1471 707/640 |
| 2001/0033557 A1 * | 10/2001 | Amalfitano | ......... | H04L 41/0896 370/335 |
| 2002/0083339 A1 * | 6/2002 | Blumenau | ........... | H04L 63/0876 709/217 |
| 2003/0074507 A1 * | 4/2003 | Weber | ................. | H04L 47/6265 710/240 |
| 2004/0098750 A1 * | 5/2004 | Kim | ........................ | G06F 16/51 725/113 |
| 2005/0125833 A1 * | 6/2005 | Nathan | ................ | G11B 27/002 725/95 |
| 2007/0112772 A1 * | 5/2007 | Morgan | .................. | G06F 21/53 707/999.009 |
| 2011/0302444 A1 * | 12/2011 | Tashima | ................ | G06F 9/4411 714/2 |
| 2016/0202909 A1 * | 7/2016 | Nguyen Tien | ........ | G06F 3/0604 711/103 |
| 2016/0373387 A1 * | 12/2016 | Reyes | ..................... | H04L 67/06 |

\* cited by examiner

*Primary Examiner* — Paul R. Myers
(74) *Attorney, Agent, or Firm* — Pearl Cohen Zedek Latzer Baratz LLP

(57) ABSTRACT

A method and a system for filtering process I/O operations are provided herein. The system may include: a memory component configured to store computer implementable instructions; and, a processor configured to implement the computer implementable instructions, such that the system is arranged to: determine that a process is queued for initiation on the system; correlate the process with one or more predefined policies; and filter the process by blocking or permitting the process from completing I.O operations on the system according to the one or more predefined policies, wherein the computer implementable instructions are implemented in a kernel-mode of the system.

15 Claims, 5 Drawing Sheets

SYSTEM AND METHOD FOR FILTERING PROCESS I/O OPERATIONS IN KERNEL-MODE

FIELD OF THE INVENTION

The present invention relates generally to cyber security, and more particularly to filtering process I/O operations on a system.

BACKGROUND OF THE INVENTION

The ongoing proliferation of internet connected computer systems has seen a commensurate increase in the number of malicious actors seeking to infiltrate and gain unauthorized access to private and sensitive data stored on these systems. One common way for malicious actors to gain access is through use of surreptitiously implanted software, known as malware, which is typically conveyed to a system packaged alongside other unrelated user-installed software and/or installed by exploiting some form of security vulnerability. While a wide variety of different types of malware are currently in circulation, all types of malware are designed with the same broad objective of infiltrating and/or causing damage to a system.

Especially problematic variants of malware, such as spyware and ransomware, are designed with capabilities to spy on the internet webpages a user is visiting or, worse, threaten to publish or perpetually block access to a user's personal data unless a ransom payment is provided. Various defensive solutions have been developed to prevent or impede the functionality of malware. Typically, these defensive solutions focus on preventing the spread of malware by forming a transmission barrier, known as a firewall, or by regularly scanning incoming and existing system files for suspect features resembling known malware. These defensive solutions are however largely deficient as many rely on a process flow involving threat detection followed by remediation, thereby necessitating the existence and operability of a threat before effective neutralization can occur. Accordingly, it as an object of the invention to propose a means for filtering process I/O operations on a system before the operation is completed.

SUMMARY OF THE PRESENT INVENTION

A computer implemented method for filtering process I/O operations on a system is disclosed herein. The method comprises: determining that a process is queued for initiation on the system; correlating the process with one or more predefined policies; and filtering the process by blocking or permitting the process from completing the I/O operation on the system according to the one or more predefined policies; wherein the determining, correlating, and filtering are conducted in a kernel-mode of the system.

A system for filtering process I/O operations is also disclosed herein. The system comprises: a memory component configured to store computer implementable instructions; and, a processor configured to implement the computer implementable instructions, such that the system is arranged to: determine that a process is queued for initiation on the system; correlate the process with one or more predefined policies; and, filter the process by blocking or permitting the process from completing the I/O operation on the system according to the one or more predefined policies; wherein the computer implementable instructions are implemented in a kernel-mode of the system.

At least one non-transitory computer-readable medium for filtering process I/O operations on a system is furthermore disclosed herein. The at least one non-transitory computer-readable medium comprises one or more instructions that, when executed by at least one processor, cause the at least one processor to: determine that a process is queued for initiation on the system; correlate the process with one or more predefined policies; and, filter the process by blocking or permitting the process from completing the I/O operation on the system according to the one or more predefined policies; wherein the one or more instructions are executed in a kernel-mode of the system.

According to some embodiments of the invention, the one or more predefined policies include at least one of: a policy relating to properties of one or more files that the process seeks to access or interact with; a policy relating to properties of the process itself; a policy relating to properties of an ancestor of the process; and a policy relating to a function the process seeks to fulfil.

According to some embodiments of the invention, the properties of the one or more files that the process seeks to access or interact with include at least one of: a path of the one or more files; an owner of the one or more files; and a type of the one or more files.

According to some embodiments of the invention, the properties of the process or the ancestor include at least one of: a path of the executable file of the process or ancestor; certificate information relating to the process or ancestor; thread properties relating to the process or ancestor; loaded library properties relating to the process or ancestor; and I/O resource properties relating to the process or ancestor.

According to some embodiments of the invention, the function the process seeks to fulfil includes at least one of: a read action; a write action; a delete action; a mapping action of a resource to memory (e.g., for reading, writing or executing); a create new action (e.g., for detecting created resources that didn't exist before); a change basic attributes action (e.g., for changing metadata, such as creation time); a move or rename action; a hard link action (e.g., for providing another "name" for a resource, in addition to the existing name); a set security action (e.g., for changing the access permissions to a resource); and, a mount action.

These and other features and advantages of the present invention are set forth in detail in the following description.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
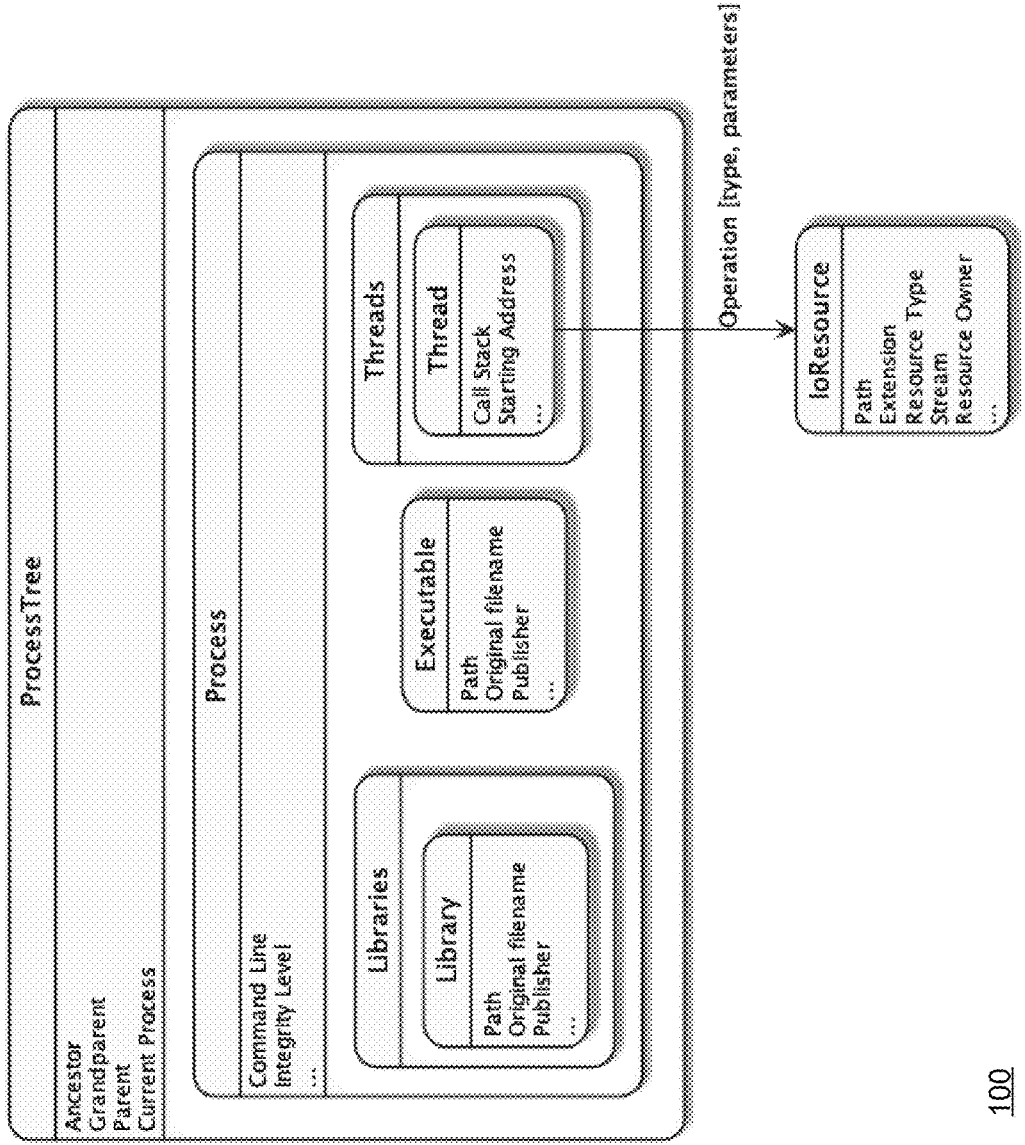
FIG. 1 is a schematic diagram illustrating an exemplary non-limited process tree according to embodiments of the present invention.

It will be appreciated that for simplicity and clarity of illustration, elements shown in the figures have not necessarily been drawn to scale. For example, the dimensions of

DETAILED DESCRIPTION OF THE INVENTION

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

The following term definitions are provided to aid in construal and interpretation of the invention.

The terms "input/output" or "I/O" are used interchangeably herein and refer generally to a communication between an information processing system and the outside world. More specifically, an "input" is a signal or data received by a system and an "output" is a signal or data sent from a system. Various devices may be used to effect I/O actions on a system, such as a keyboard or computer mouse used by a human operator, or a modem or network card operated autonomously.

The terms "process I/O operation", "I/O operation", "I/O process" and "I/O action" are used interchangeably herein and refer to computer program code that is executed, or queued for execution, in response to an input or output command received by a system. Typically the computer program code will define an activity or function for the system to implement and may, optionally, be grouped or associated with other computer program code for collective execution. "Reading" is one such function performed by a computer whereby data is acquired from a source and placed into volatile memory for subsequent processing. "Writing" is another such function whereby data is written to a source, such as a non-volatile memory component, for subsequent processing. "Deleting" is also an exemplary function whereby data is expunged from a memory component such that it precluded from being read in the future. Other actions may include actions that have additional functionality such as mapping action of a resource to memory; creating a new action; changing basic attributes action; moving or renaming action; a hardlink action; a set security action; and a mount action.

The terms "kernel" and "kernel-mode" are used interchangeably herein and refer generally to a computer program at the core of a computer's operating system that has complete unrestricted control over everything in the system. The kernel is often the first program to be loaded by a system upon startup and acts to facilitate interactions between hardware and software components. The kernel is moreover typically a portion of an operating systems' code that is always resident in memory and is, importantly, loaded in a separate area of the memory that is secluded from access by application software and other less critical parts of the operating system. This separation is essential for preventing user data and kernel data from interfering with each other, as well as for preventing malfunctioning or malicious applications from crashing the entire operating system.

The terms "ancestor", "parent" and "grandparent" are used interchangeably herein and refer generally to an antecedent process that temporally precedes a subsequent or "child" process. In some circumstances, the parent process may terminate prior to the child process initiating, resulting in the child process being known as an "orphan process". In alternative circumstances, the parent process may remain active throughout the lifecycle of the child process and may be reliant on execution data received from the child process, possibly leading to the emergence of a "zombie process" in circumstances where data is improperly exchanged between the child and parent process.

The present invention relates to a means for selectively filtering I/O operations yet to be fully completed on a host computer system. When an I/O operation is queued for initiation on a host computer system it is assessed by an I/O filter which correlates between the various processes already running on the system, the file(s) with which the I/O operation seeks to interact, and the function which the I/O operation seeks to undertake, and duly examines the same in relation to a set of pre-defined policies. These pre-defined policies are based on three principal factors which include the properties of the relevant file(s) (e.g., file path and file type), the properties of the process I/O operation queued for initiation (e.g., process path or certificate information), and the function or action the process I/O operation seeks to undertake (e.g., read, write, delete). The I/O operation queued for initiation is then either permitted to proceed with its respective activity where permissible according to the pre-defined policies, or temporarily or indefinitely blocked from completing on the system.

Critically, the I/O filtration functionality of the present invention is configured to be conducted wholly within the kernel-mode of the host system. This poses numerous advantages. One advantage is that the I/O filter is able to intercept and immediately block malicious processes from ever being fully completing the I/O operation on the system as all I/O operation initiation requests must typically be permitted via kernel-mode provisions before being actuated on the system. This approach is a significant improvement over the standard user-mode solutions may stop the I/O operation from initiating in the first place. The main drawback of these solution is that this defense can be bypassed as explained below. Indeed, in circumstances where remedial action must be taken, it is possible, particularly where one is dealing with sophisticated malware, that malicious actions may already have occurred prior to the effective implementation of the remedial action.

It is also known that user-mode malware processes feature increasingly advanced evasion and avoidance capabilities to bypass prevalent user-mode anti-malware solutions, such as by communicating directly with a kernel-mode interface of the system using syscalls, thereby bypassing user-mode security provisions (such as those using, for example, API monitoring). By implementing a kernel-mode solution, the present invention effectively operates with higher privileges, because the malware runs in user-mode, while the I/O filter runs in kernel-mode. The problem with user-mode solutions is that they are on the same leveled playing field with the malware, running in the same memory space, therefore the malware can influence the implemented protections. On the contrary, the I/O filter in accordance with some embodiments of the present invention runs in the kernel-mode memory space which is separated from the malware user-mode memory space.

Accordingly, whereas user-mode malware may be effective in bypassing user-mode anti-malware solutions, the enforced separation between user and kernel-modes on a system preclude user-mode malware from bypassing kernel-mode solutions.

The present invention is also advantageous owing to accuracy and performance improvements over existing anti-malware solutions. In particular, the proposed policy filtration approach looks at three factors, as aforementioned, rather than just one. Correlating between these three factors allows for a more detailed assessment of each I/O operation, thereby improving filtration accuracy and reducing false-positive results. Further, by implementing the policy filtration solution at process creation rather than following I/O operation initiation/completion, it is possible for a less onerous assessment regime to be undertaken, thereby reducing processing overheads and improving system performance.

The present invention broadly comprises a computer system having a file-system filter driver and a process manager. The process manager, also referred herein to collectively as a kernel-mode process tracker and user-mode process tracker, is operable to track process lifecycles including process creation and process termination. When a process is created, the process manager is configured to assess the process in relation to the various pre-defined policies and rules and match the process with relevant subentries. The file-system filter driver is correspondingly configured to monitor action requests on files performed by the process and, if precluded by a pre-set policy or rule, blocks the action (e.g., blocks a requested delete action) and, optionally, terminates the process.

FIG. 1 is a schematic diagram 100 illustrating an exemplary non-limited process tree for matching pre-defined policies and rules according to embodiments of the present invention. Each of the illustrated properties is compiled from various sources. In particular, process tree and process properties are maintained by the kernel-mode process tracker and provided by an operating system callback. Process threads and thread properties are also maintained by the kernel-mode process tracker and provided by an operating system callback. Process executable and loaded libraries properties are computed by the user-mode process tracker by inspecting the metadata of the executable format (e.g., PE format in windows) of the associated files. Operation as well as resource properties are handled by the kernel-mode I/O filter and provided by an operating system callback.

The various pre-defined policies and rules may take into account all aspects of the I/O process and/or antecedents to the process, the functionality of the process, and the files the process seeks to interact with, as would be appreciated by those skilled in the art. By way of non-limiting example, any of the following may be assessed: process properties (command line, user executing, ancestor processes); executable properties (executable file path, executable file properties/headers, certificate information); loaded library properties (library file path, library file properties/headers, certificate information); thread properties (call stack, starting point); operation properties (action, flags and parameters); I/O resource properties (path, extension, file system stream, magic, owner); and, policy matcher/enforcer properties (optimizations, process cache, file global cache, file handle cache).

It will be appreciated that typically only some of the pre-defined policies and rules described and illustrated in the foregoing will be relevant for a specific I/O process. It is accordingly necessary for the I/O process to be matched or linked with only those pre-defined polices or rules which are relevant. The more properties that are matched, however, the easier and more accurate the differentiation between legitimate and malicious processes will be. Conversely, the fewer properties matched, the harder and less accurate the differentiation will be. By way of non-limiting example, an innocuous I/O process seeking to access a text document may be difficult to differentiate from a malicious one when looking solely at the origins of the I/O process or details of the text document the I/O process seeks to access. By examining also the function that the I/O process seeks to undertake, it is possible to further differentiate whether the process is harmless in nature, for example where the process seeks only to read the document, or whether the process is potentially malicious, for example where the process seeks to delete the document or content within the document.

By way of further non-limiting example, an exemplary policy rule may dictate that if the following collection of properties is found to be present, the I/O process should be blocked: the operating system is Windows; the operation type is write; the I/O resource type is file; the I/O resource (file) has an extension of ".ps1"; and, the executable associated with the process performing the operation has a signature that is valid, has a publisher of "Microsoft Corporation", and has a filename that is "winword.exe". This exemplary policy rule is effective for the purposes of mitigating the potential damage that may be done using Microsoft Office Macros since, even if their execution is permitted, the I/O filter can block the macro from writing further Powershell (ps1) scripts ("dropping"), thereby disrupting the attack chain.

Figure 2A:
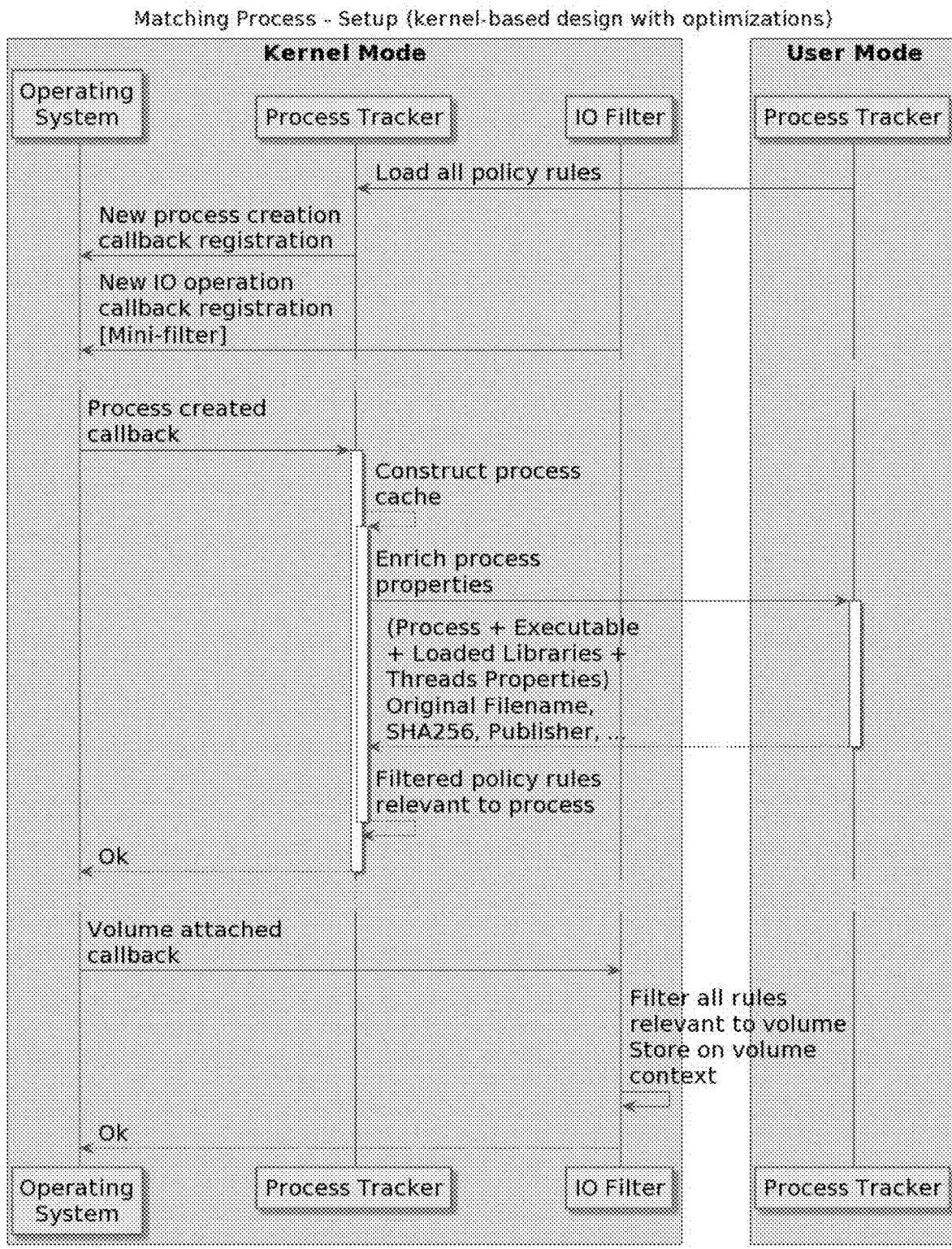
FIGS. 2A and 2B are graphical flow diagrams illustrating an exemplary non-limited kernel-mode matching process according to embodiments of the present invention.
Figure 2B:
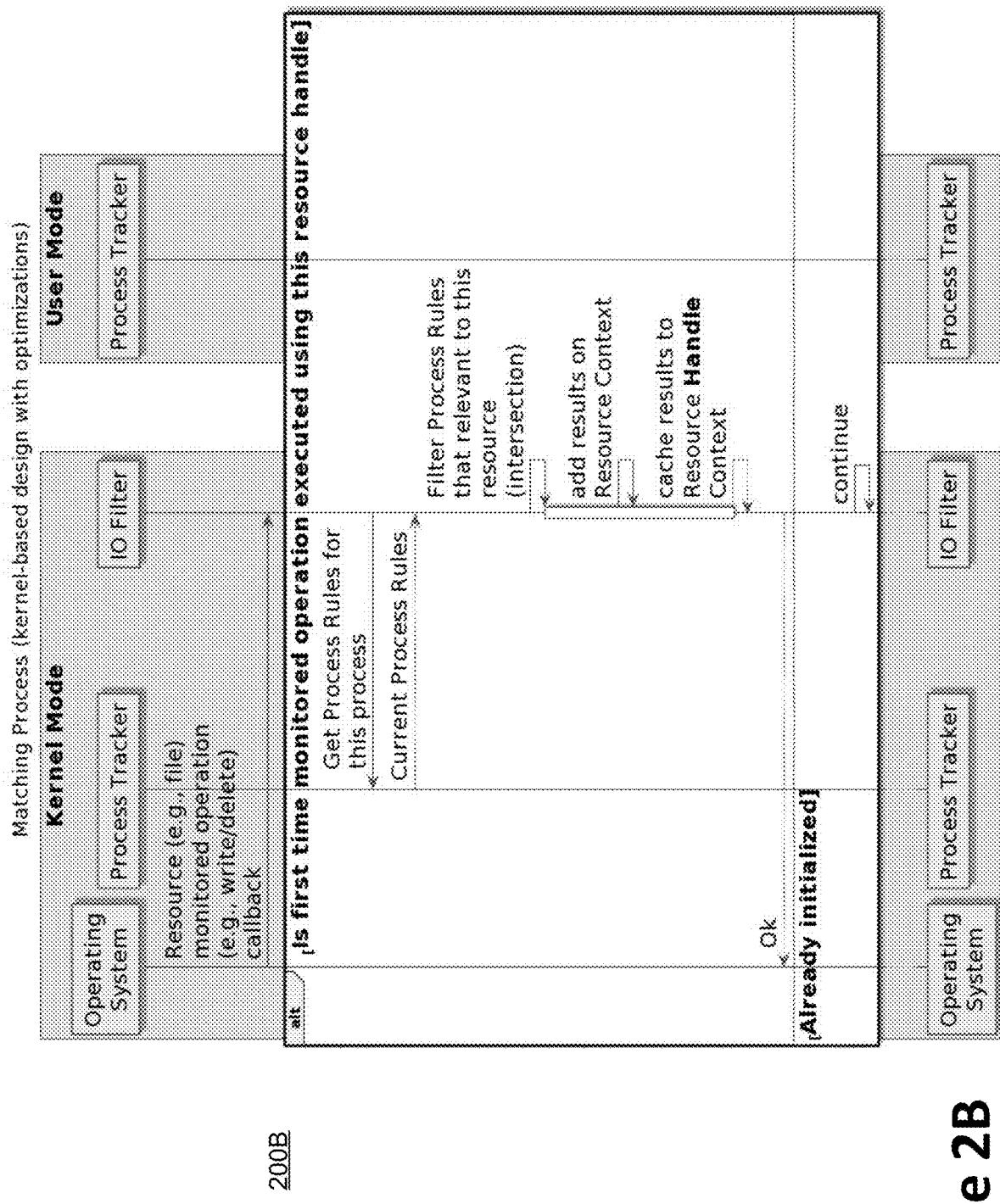

The present invention may be materially implemented in a variety of ways, as would be appreciated by those skilled in the art. FIGS. 2A and 2B are graphical flow diagrams 200A and 200B illustrating an exemplary non-limited kernel-mode IO stack matching implementation according to an embodiment of the present invention based on filtering IO requests in the driver stack. Another conceivable implementation would be a kernel-mode API monitoring solution, which is based on hooking syscall handlers (e.g., in Linux x86_64, unlink syscall #87 which is used for deletion). Although not the subject of the present invention, a user-mode API monitoring solution is also envisaged, which is based on hooking the relevant APIs in runtime (e.g., in Windows, DeleteFileA function).

Owing to the frequency with which I/O operations are generated in modern computing, it is a desirable objective of the present invention to minimize latency arising as a result of the aforedescribed policy rule matching process. To achieve this, embodiments of the invention propose an approach whereby pre-processing and caching occurs at various points. A number of caching layers are accordingly envisaged, including: a per volume context layer (all the rules relevant to the volume—computed at driver initialization); a per process context layer (all the rules relevant to the process—computed at process creation); a per resource handle context layer (e.g., file handle—a specific file opened by a specific process; computed at the first time a monitored operation tries to execute); and, a per resource context (e.g., file; updated lazily by the resource handle context computation, to save processing on the computation by memorizing the results).

Figure 3:
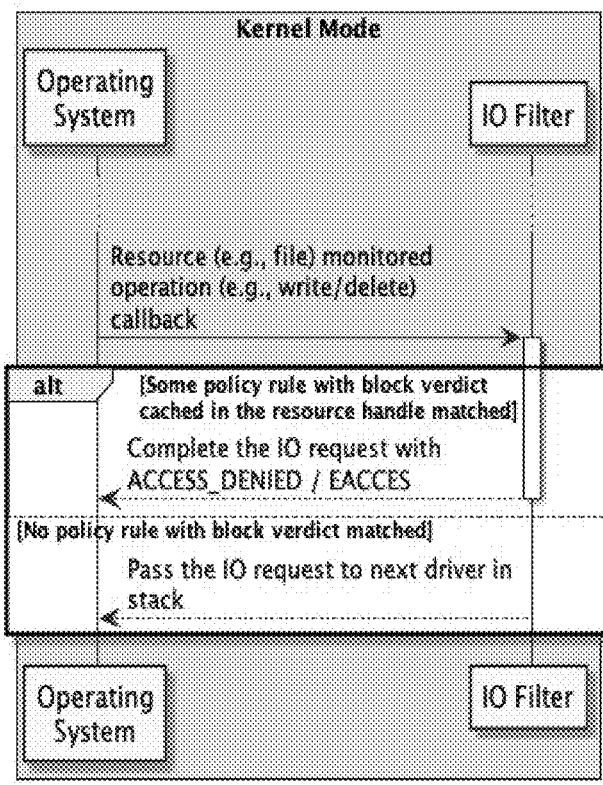
FIG. 3 is a graphical flow diagram illustrating an exemplary non-limited filtering process according to embodiments of the present invention.

FIG. 3 is a graphical flow diagram 300 illustrating an exemplary non-limited filtering process according to embodiments of the present invention. In the case of a kernel-mode API monitoring implementation, blocking may be achieved by not forwarding the call and returning a permission error to the API caller. Where blocking does not occur, the call will be forwarded as standard. In the case of a kernel-mode IO stack matching implementation, blocking may be achieved by completing the IO request with an access denied result. Where blocking does not occur, the request is passed through to the next driver in the stack.

Figure 4:
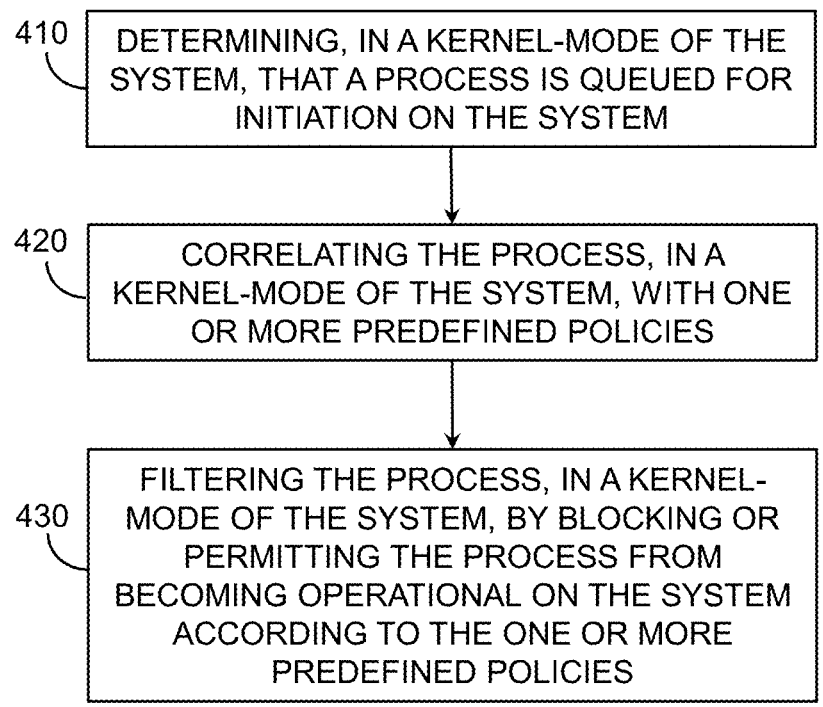
FIG. 4 is a graphical flow diagram illustrating an exemplary method for filtering processes on a system according to embodiments of the present invention.

FIG. 4 is a graphical flow diagram illustrating an exemplary method for filtering process I/O operations on a system according to an embodiment of the invention. The method may comprise the steps of: determining, in a kernel-mode of the system, that a process is queued for initiation on the system 410; correlating the process, in a kernel-mode of the system, with one or more predefined policies 420; and, filtering the process, in a kernel-mode of the system, by blocking or permitting the process from becoming operational on the system according to the one or more predefined policies 430.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "1system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A computer implemented method for filtering process I/O operations on a system, comprising:
   determining that a process is queued for initiation on the system;
   correlating the process with one or more predefined data security policies before the process is functional on the system; and
   blocking or terminating the process by preventing the process from actuating I/O operations on the system in the event that the process contravenes the one or more predefined data security policies,
   wherein the determining, correlating and blocking or terminating are conducted in a kernel-mode of the system.

2. The method of claim 1, wherein the one or more predefined data security policies include at least one of:
   a policy relating to properties of one or more files that the process seeks to access or interact with;
   a policy relating to properties of the process itself;
   a policy relating to properties of an ancestor of the process; and
   a policy relating to a function the process seeks to fulfil.

3. The method of claim 2, wherein the properties of the one or more files that the process seeks to access or interact with include at least one of:
   a path of the one or more files;
   an owner of the one or more files; and
   a type of the one or more files.

4. The method of claim 2, wherein the properties of the process or the ancestor include at least one of:
   a path of executable file of the process or ancestor;
   a part of the certificate information of the process or ancestor;
   certificate information relating to the process or ancestor;
   thread properties relating to the process or ancestor;
   loaded libraries properties relating to the process or ancestor; and
   I/O resource properties relating to the process or ancestor.

5. The method of claim 2, wherein the function the process seeks to fulfil includes at least one of:
   a read action;
   a write action;
   a delete action;
   a mapping action of a resource to memory;
   a create new action;
   a change basic attributes action;
   a move or rename action;
   a hardlink action;
   a set security action; and
   a mount action.

6. A system for filtering process I/O operations, comprising:
   a memory component configured to store computer implementable instructions; and
   a processor configured to implement the computer implementable instructions, such that the system is arranged to:
   determine that a process is queued for initiation on the system;
   correlate the process with one or more predefined data security policies before the process is functional on the system; and
   block or terminate the process by preventing the process from actuating I/O operations on the system in the event that the process contravenes the one or more predefined data security policies,
   wherein the computer implementable instructions are implemented in a kernel-mode of the system.

7. The system of claim 6, wherein the one or more predefined data security policies include at least one of:
   a policy relating to properties of one or more files that the process seeks to access or interact with;
   a policy relating to properties of the process itself;
   a policy relating to properties of an ancestor of the process; and
   a policy relating to a function the process seeks to fulfil.

8. The system of claim 7, wherein the properties of the one or more files that the process seeks to access or interact with include at least one of:
   a path of the one or more files;
   an owner of the one or more files; and
   a type of the one or more files.

9. The system of claim 7, wherein the properties of the process or the ancestor include at least one of:
   a path of the process or ancestor;
   a publisher of the process or ancestor;
   a filename of the process or ancestor;
   certificate information relating to the process or ancestor;
   thread properties relating to the process or ancestor;
   loaded library properties relating to the process or ancestor; and
   I/O resource properties relating to the process or ancestor.

10. The system of claim 7, wherein the function the process seeks to fulfil includes at least one of:
    a read action;
    a write action;
    a delete action;
    a mapping action of a resource to memory;
    a create new action;
    a change basic attributes action;
    a move or rename action;
    a hardlink action;
    a set security action; and
    a mount action.

11. A non-transitory computer-readable medium for filtering process I/O operations on a system comprising one or more instructions that, when executed by at least one processor, cause the at least one processor to:
    determine that a process is queued for initiation on the system;
    correlate the process with one or more predefined data security policies before the process is functional on the system; and
    block or terminate the process by preventing the process from actuating I/O operations on the system in the event that the process contravenes the one or more predefined data security policies,
    wherein the one or more instructions are executed in a kernel-mode of the system.

12. The non-transitory computer-readable medium of claim 11, wherein the one or more predefined data security policies include at least one of:
    a policy relating to properties of one or more files that the process seeks to access or interact with;
    a policy relating to properties of the process itself;

a policy relating to properties of an ancestor of the process; and a policy relating to a function the process seeks to fulfil.

13. The non-transitory computer-readable medium of claim 12, wherein the properties of the one or more files that the process seeks to access or interact with include at least one of:

a path of the one or more files;

an owner of the one or more files; and, a type of the one or more files.

14. The non-transitory computer-readable medium of claim 12, wherein the properties of the process or ancestor include at least one of:

a path of the process or ancestor;

a publisher of the process or ancestor;

a filename of the process or ancestor;

certificate information relating to the process or ancestor;

thread properties relating to the process or ancestor;

loaded library properties relating to the process or ancestor; and

I/O resource properties relating to the process or ancestor.

15. The non-transitory computer-readable medium of claim 12, wherein the function the process seeks to fulfil includes at least one of:

a read action;

a write action;

a delete action;

a mapping action of a resource to memory;

a create new action;

a change basic attributes action;

a move or rename action;

a hardlink action; a set security action; and, a mount action.

* * * * *